United States Patent

[11] 3,575,257

| [72] | Inventor | Richard J. Wojcikowski<br>Toledo, Ohio |
|---|---|---|
| [21] | Appl. No. | 798,713 |
| [22] | Filed | Feb. 12, 1969 |
| [45] | Patented | Apr. 20, 1971 |
| [73] | Assignee | Dana Corporation<br>Toledo, Ohio |

[54] VEHICLE SPEED CONTROL DEVICE
12 Claims, 5 Drawing Figs.

[52] U.S. Cl. .................................................. 180/105,
180/108, 123/103, 74/665
[51] Int. Cl. .................................................. B60k 31/00
[50] Field of Search .......................................... 180/105-
—110; 123/103; 74/665

[56] References Cited
UNITED STATES PATENTS

| 1,984,831 | 12/1934 | Higley .......................... | 74/767X |
| 2,594,739 | 4/1952 | Davis............................ | 180/106X |
| 2,900,465 | 8/1959 | Weiss ........................... | (200/61.46) |
| 2,978,059 | 4/1961 | Miller........................... | 180/105 |
| 3,099,330 | 7/1963 | Berg et al...................... | 180/108 |

*Primary Examiner*—Kenneth H. Betts
*Attorneys*—Richardson B. Farley, Harold D. Shall, John F. Teigland and Walter E. Pavlick

ABSTRACT: A speed control unit is provided wherein two input speed signals are received mechanically, one being a referenced speed and the other being the actual speed, and these speeds differenced so as to provide an output signal which can be utilized to accelerate or decelerate an engine which is to be automatically controlled.

INVENTOR.
RICHARD J. WOJCIKOWSKI

BY Richardson B Farley

ATTORNEY

VEHICLE SPEED CONTROL DEVICE

This invention relates to speed control device sand more particularly to a device for controlling the engine speed of an automotive vehicle internal combustion engine relative to a desired vehicle speed.

Prior art devices for controlling engine speed of an automotive vehicle have utilized various mechanical or electrical or combined mechanical and electrical components, but these devices, in order to provide close speed control, have generally had fairly complicated mechanical and electrical structure to accomplish speed read out. The best known prior art devices which have a fairly simplified readout system are those units which utilize a centrifugal governor with mounted weights that rotate around the axis of a precompressed spring or stop to thereby provide control of the vehicle throttle setting or inform the driver (e.g., by throttle back pressure) that the desired vehicle speed has been reached. These mechanical speed readout units suffer from the general disabilities of such a centrifugal governor, that is, the difficulty in setting the proper precompression in the spring, or the large space required for the centrifugal governor or the fairly high expense of some of the components of the speed control. Accordingly, it would be advantageous to devise a speed control unit which included a mechanical arrangement for accurate speed control that did not utilize a centrifugal governor arrangement comprising weights and/or a precompressed spring means and at the same time a speed control unit that was inexpensive and that provided extremely precise and accurate control.

It is, therefore, an object of this invention to provide a speed control device having a two speed input and a mechanical referencing system capable of rapid adjustment to variances in the set speed.

It is yet another object of this invention to provide a simple, compact and economical speed control device for a vehicle having an internal combustion engine.

It is still another object of this invention to provide a speed control device having means for maintaining the vehicle at a substantially constant predetermined speed without further attention by the vehicle's operator.

Another object of this invention is to provide a speed control device adapted for maintaining a vehicle at a substantially constant predetermined speed and one which has manually controlled electric means for adjusting the speed control for maintaining a precise predetermined speed.

It is a still further object of this invention to provide a mechanical means for comparing two varying speed signals, differing therebetween and providing an output signal to obtain and maintain control of a given speed.

Other objects and advantages of this invention will become apparent from the following description taken in conjunction from the accompanying drawings in which.

Figure 1:
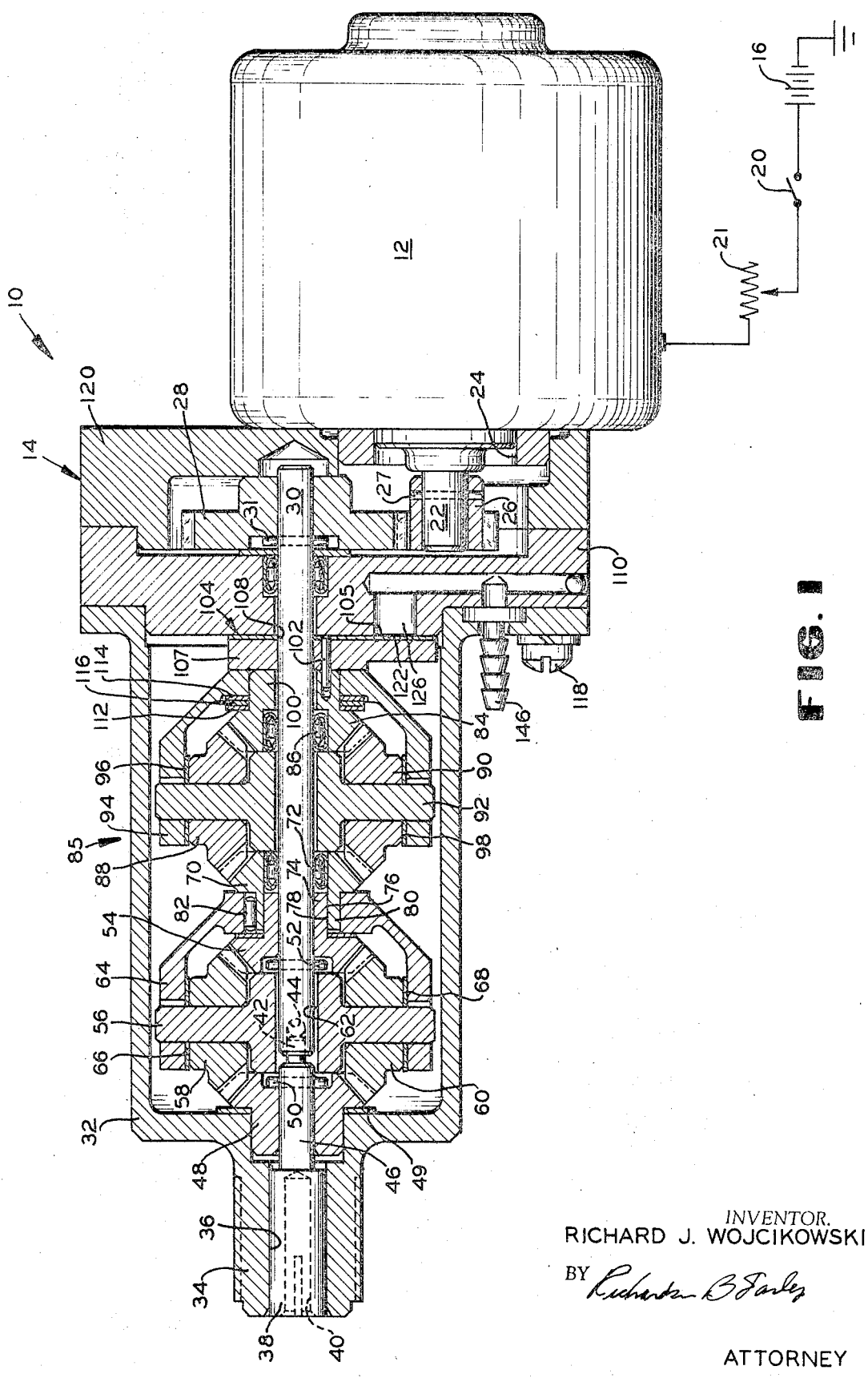
FIG. 1 is a view in elevation, partly in cross section, of the speed control unit of the present invention.
Figure 2:
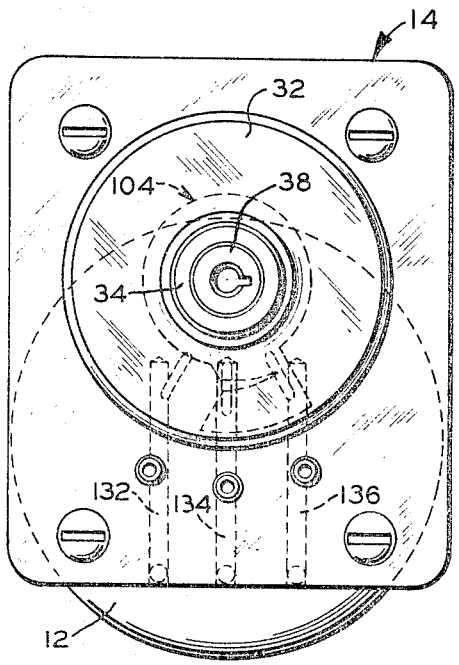
FIG. 2 is an end view of the speed control unit of FIG. 1 showing the porting arrangement in phantom.

Referring to FIG. 1 wherein there is shown a speed control unit 10 having a reference speed provided by an electric motor 12 which may conveniently take the form of a variable speed DC electric motor operated by the vehicle's 12 volt electrical supply and which may, for example, have a rated output speed of 3,600 r.p.m. The motor 12 is attached to a housing 14 of the speed control unit 10 by any conventional means and is electrically connected to a grounded battery 16 through a brake operated switch 20. The brake operated switch 20 opens upon depression of the brake pedal (not shown) to place the speed control unit in inoperative condition. The electric motor 12 is driven at a speed which is manually set by manual manipulation of a variable resistance 21. This resistance, of course, may be conveniently calibrated to vehicle miles per hour to render its setting extremely easy and uncomplicated.

A shaft 22 extends from the electric motor 12 through an opening 24 in the housing 14 and has mounted thereon a gear 26 which is fixed to rotate with the shaft 22 by a pin means 27. The gear 26 is in mesh with an axially aligned gear 28 mounted fixed with respect to a shaft 30 by another pin means 31. Shaft 30 is thereby driven at a referenced input speed dictated by the manually set variable resistance 21, with the gear reduction furnished by gears 26 and 28 providing sufficient torque so that a fractional horse power electric motor may be utilized as the electric motor 12.

The housing 14 of the speed control unit 10 includes a main housing portion 32 which takes the form of a hollow cylindrically-shaped element having an integral small cylindrical extension 34 coaxial with the axis of the main housing portion of the housing. The cylindrical extension 34 receives the speedometer cable (not shown) so that an output speed of the vehicle is provided as an input to the speed control unit 10. This is accomplished in the following manner. A cylindrical bore 36 passes through a major portion of the cylindrical extension 34 and is adapted to receive a cylindrical shaft 38. Shaft 38 is provided at its external end with a blind bore 40 so as to receive the speedometer cable therein. The shaft 38 is conventionally attached to the speedometer cable and therefore directly driven thereby. The opposite end of the shaft 38 is stepped so as to provide a reduced diameter portion 42 which is received in a blind bore 44 in shaft 30 so as to pilotingly support the end of shaft 30 which is most distant from the electric motor 12.

Intermediate the reduced portion 42 and the external, leftward end of the shaft 38 is an intermediate diameter portion 46 on which is mounted a bevel side gear 48. A dowel pin 50, passing through the intermediate diameter portion 46, prevents axial movement of the gear 48 on the shaft 38, and also causes it and the shaft 38 to rotate together so that the bevel side gear 48 is driven at a first input speed dictated by the speed of the vehicle. In order to insure proper rotation of the bevel gear 48, a washer 49 is disposed between it and the main housing portion 32 to serve as a bearing surface for the leftward face of the bevel gear 48.

A second dowel pin 52 passes through the shaft 30 near the end of the shaft adjacent to the bevel gear 48 so as to place this shaft in a driving relationship to a second bevel side gear 54 which is mounted thereon. The bevel gear 54 is, thus, driven at a second input speed dictated by the electric motor 12 with the first and second input speeds being provided so that the bevel gears 48 and 54 rotate in opposite directions relative to each other.

Rotatably mounted on a cross-shaft 56 which is oriented transverse to the shafts 30 and 38 are pinion gears 58 and 60 which, in turn, engage and mesh with the bevel side gears 48 and 54. The cross-shaft 56 has a cylindrical bore 62 therethrough in which portions of the coaxial shafts 38 and 30 are disposed, with the cross-shaft 56 rotatable about the axis of the shafts 38 and 30. Attached to the opposite ends of the cross-shaft 56 is a carrier 64. This carrier provides a thrust member for the pinion gears 58 and 60 and rotates with the cross shaft 56 when the first and second input speeds are different in magnitude and the gears 58 and 60 move rotatably around one of the bevel gears 48 or 54, the rotational movement of the carrier 64 being equal to one half the difference between the first and second input speeds since the diameter and number of teeth provided for the gears 48, 54, 58 and 60 are all made equal. It should be noted, however, that varying diameters and numbers of teeth on these gears will provide the same effect. Thrust washers 66 and 68, interposed between the carrier 64 and pinion gears 58, 60, respectively, prevent any wear occurring to the carrier 64 from the relative rotation of the pinion gears 58 and 60.

A third bevel side gear 70 is also provided. It is rotatably mounted on shaft 30 axially rightwardly of the first and second bevel gears 48, 54 by being mounted by means of a needle bearing arrangement 72. To help support the bevel side gear 70, the bevel side gear 54 has an extended portion 74 that has a finished outer diameter 76 mating with a bore 78 formed within an extension 80 of side gear 70.

In order for resultant rotation of the carrier 64 to be imposed upon the bevel side gear 70, the extension 80 is pinned to the carrier 64 in a driven relationship by a dowel pin 82. Thus, the third side gear 70 moves rotationally at the same speed and in the same direction as the carrier 64.

A fourth bevel side gear 84 is also rotatably mounted on shaft 30 by the use of a needle bearing 86, with this bevel gear disposed axially rightwardly and in a confronting relationship to side gear 70. Disposed between bevel side gears 70 and 84 is a second set of pinion gears 88 and 90, with the diameter and number of teeth on each of these four gears equal in the embodiment illustrated. The pinion gears 88 and 90 mesh with the side gears 70 and 84 and are, in turn, rotatably mounted on a cross-shaft 92 with a second carrier 94 providing the thrust member for them. The carrier 94 is piloted on an axial extension 100 of the fourth side gear 84 and is rotatable relative to this side gear and the side gear 70. Similarly to the first pair of pinion gears, thrust washers 96 and 98 are interposed between pinion gears 88 and 90 and the carrier 94 to prevent wear between the carrier and these rotating pinion gears.

The mode of operation of this device as so far described is as follows: the variable speed DC electric motor 12 is set at a speed corresponding to the desired vehicle speed to provide a first input speed signal to the second bevel side gear 54. Assuming the vehicle is traveling at slower than the selected speed the second speed input signal from the speedometer would be turning the first side gear 48 at a slower rate than the second side gear 54. Due to this relative speed difference, the first set of pinion bevel gears 58 and 60 will rotate on their cross-shaft 56 and cause the cross-shaft 56 and carrier 64 to rotate about the shaft 30 thereby rotating the third side gear 70 which is fixed to the carrier 64. As bevel gear 70 rotates, the second set of pinion gears 88 and 90 will tend to rotate bevel gear 84 although the bevel gear 84 is limited in its rotation (as will be described below) it tends to rotate at one quarter of the difference between the initial speeds of the shafts 30 and 38. Because of the limited rotation of the bevel gear 84, the second carrier 94 will also rotate at substantially one quarter the difference between the initial speeds of the shafts 30 and 38 and thus a near nonoscillatory mechanical control system is obtained and a speed differencing means 85 is provided for the speed control 10, the said differencing means taking the form of a double differential which broadly may be considered a planetary means.

Figure 3:
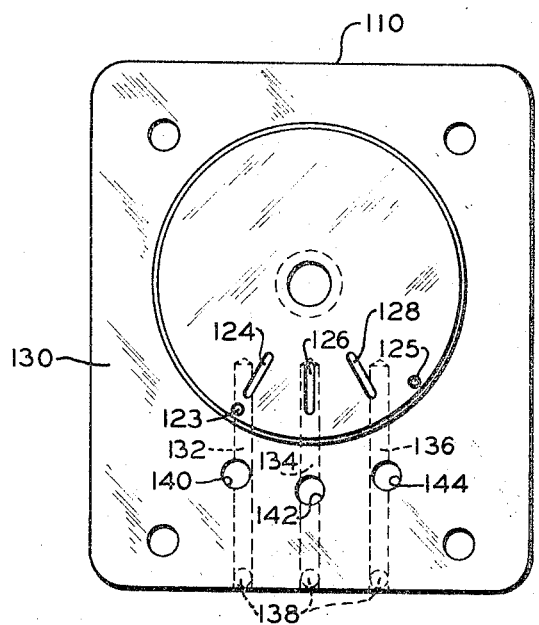
FIG. 3 is an end view of the valve body showing the porting arrangement in phantom.

In order to couple the output signal of the double differential arrangement into the remainder of the speed control system and to convert this output signal into a usable signal to activate the vehicle throttle, the bevel gear 84 is limited in rotation by having a pin 102 attached thereto and extending axially rightwardly to engage in a valve plate 104, the pin 102 engages in the valve plate 104 in a bore 106 disposed therein, which is located slightly below the axial centerline of shaft 30 but directly on the vertical centerline of the valve plate 104. A bore 108 in the valve plate 104 permits this valve plate to be mounted for pivotal movement on the shaft 30. The valve plate 104 therefore rotates with the bevel gear 84 in a driving relationship, but is limited in its rotation by a pair of arcuately spaced pin means 123, 125 (FIG. 3).

The valve plate 104 is urged axially rightwardly into abutment with a valve body 110 by means of a pair of thrust washers 112, 114 and a wave washer 116 situated between them, these three washers being disposed between the second carrier 94 and the bevel side gear 84. A spacer washer 107 is disposed between the bevel gear 84 and the valve plate 104 to spacedly displace these two elements relative to each other.

Valve body 110 is boltingly attached to the main housing portion 32 by bolts 118 (only one shown) so that the valve body periphery forms a portion of the housing 14 and so that it is immovable relative to the valve plate 104. These same bolts are also used to fixedly attach a housing cap 120 to the valve body 110 to complete the housing 14.

Figure 4:
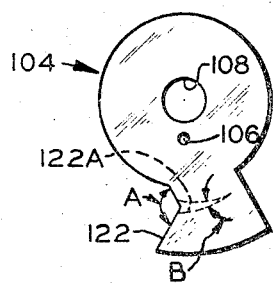
FIG. 4 is a view in elevation of the valve plate of the device.

As set out before, the valve plate 104 is limited in turning movement on the valve body 110 by the pair of arcuately spaced pins 123, 125 which extend axially leftwardly from the inner face of the valve body 110. Thus, the valve plate 104 is constrained for limited arcuate movement relative to the valve body 110 between two reference points, these points representing, respectively, throttle advance and throttle retard. This valve plate is generally "keyhole" shaped (FIG. 4) and includes a V-shaped side 122 providing an opening extending inwardly from one edge beyond the vertical centerline of the valve plate 104 and terminating in a shallow tapering V-groove 122A disposed in the back face of the valve plate 104. The opening provided by the V-shaped side 122 and V-groove 122A provides a varying volume of communication between a series of first ports 124, 126, and 128 in valve body 110 (FIG. 3), the V-shaped side 122, as will be apparent, forming a large angle A for major communication and speed response while the narrow angle B provides for small adjustments and minor speed correction.

Each of the aforementioned ports is oblong in shape extending radially outwardly as to intersect with the opening formed by V-shaped side 112 and V-groove 122A by opening at a face 130 of valve body 110; the said face directly confronting the face 105 of valve plate 104. Each of ports 124, 126 and 128 extends inwardly to communicate with a blind channel 132, 134 and 136, respectively, with each of these channels extending vertically downwardly and being terminated adjacent the lower edge of valve body 110 by a series of plugs 138, 138, 138. Intermediate the blind ends of the blind channels 132, 134, 136 and the ports 124, 126 and 128 are a series of second ports 140, 142 and 144 which open outwardly at face 130 and inwardly to channels 132, 134 and 136, respectively.

The ports 140, 142 and 144 are provided with conventional fittings for easy connection to rubber tubing or the like such as fitting 146 (FIG. 1) and needle valves (not shown) may also be interposed in the channel networks formed in part by the ports 140, 142 and 144 so as to balance the flow outwardly through these three ports. Each of the hoses 148, 150, 152 for the ports 144, 142 and 140 are connected (FIG. 5), respectively, to a vacuum supply 154 such as the vehicle manifold, a dump valve 155 and bellows 156 connected through a chain 158 or the like attached to a vehicle throttle plate 160 and an air supply 162 such as atmosphere. It should be clear that with this arrangement of the V-sided and V-grooved valve plate 104, valve body 110 and channels therethrough that a modulated supply pressure is provided by communication furnished by the opening formed by the V-side 122 and the V-groove 122A between the vacuum supply 154, the atmospheric supply 162 and bellows 156 and that this modulated pressure is dependent upon the relative positioning of valve plate 104 as assumed through the aegis of the differencing means 85. It should be noted, because the opening formed by the V-side 122 is over air supply port 140, that a constant bleed of air is furnished to bellows 156 and the air supply is then modulated by the varying vacuum supply through port 144.

Figure 5:
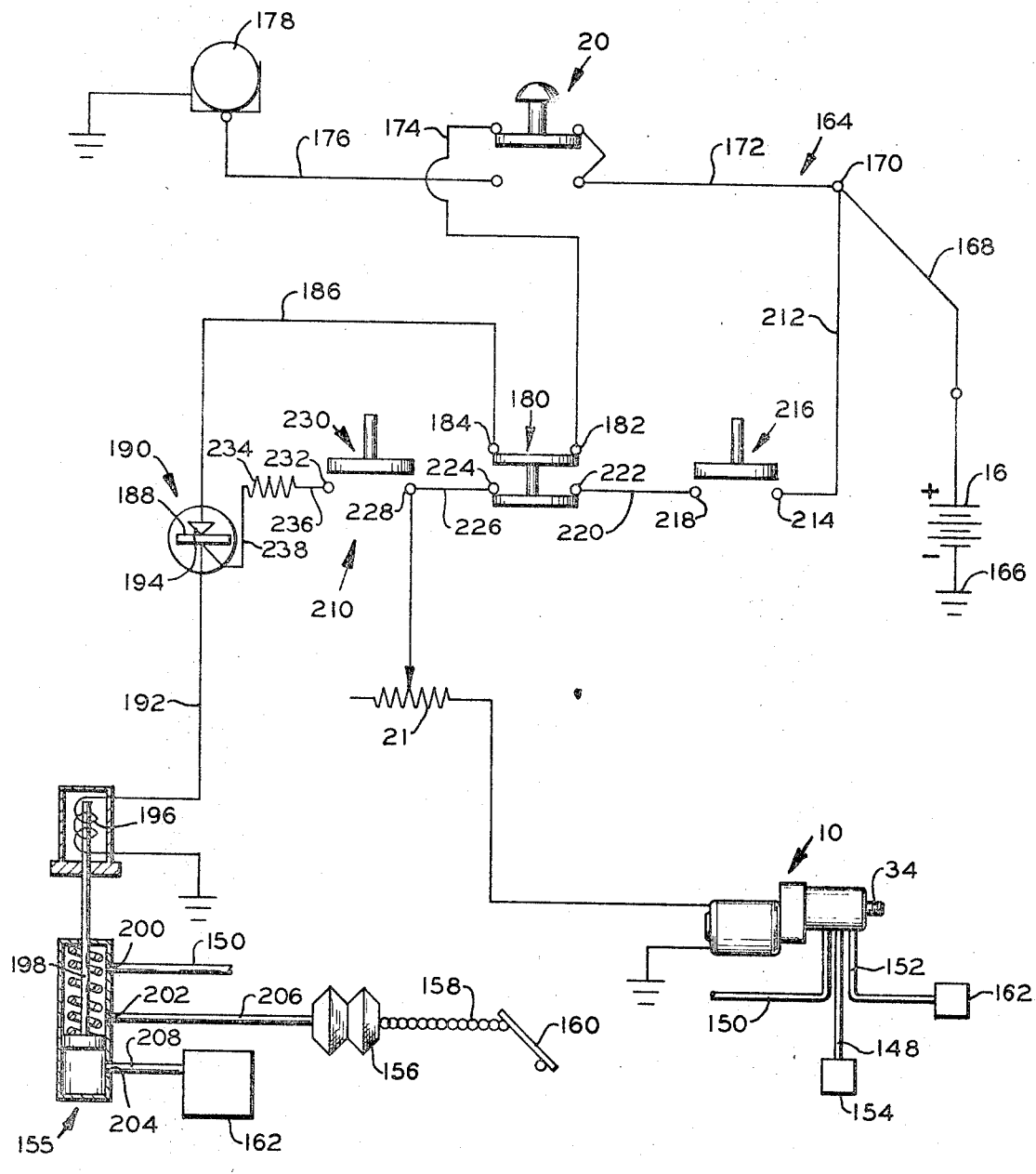
FIG. 5 is a full schematic of the electrical control circuitry for the speed control unit.

A complete control circuit 164 for the speed control device 10 is illustrated in FIG. 5. This control circuit includes the battery 16 which is grounded at 166 and has attached thereto a lead 168 extending to and electrically connected to a contact 170. A lead 172 extends from contact 170 to brake switch 20. This switch is disposed so as to provide electrical contact between lead 172 and a lead 174 as long as the brake switch 20 is in the position illustrated (the vehicle brake in an unactuated condition). When the vehicle brake is applied switch 20 is depressed, placing lead 172 in electrical connection with a lead 176, this lead being connected to a grounded brake light 178. Thus, actuation of the brakes of the vehicle breaks the electrical connection between lead 172 and lead 174 and at the same time energizes brake light 178.

Lead 174 extends to and is electrically connected to a transmission drive switch 180 by a contact 182 when the vehicle's transmission is in drive condition. An opposite contact 184 os the transmission drive switch 180 is electrically connected to a lead 186 that extends to and is connected to an anode 194 of a silicon controlled rectifier 190.

A lead 192 extends from an cathode 188 of the silicon controlled rectifier 190 so as to be connected with a magnetic coil 196 of the dump valve 155. This dump valve includes a piston 198 and three ports 200, 202, 204, with the piston capable of assuming two separate positions depending on whether the magnetic coil 196 is energized or not. Upon energization of the magnetic coil 196, the piston 198 moves upwardly to the position illustrated in FIG. 5 so as to place the port 200 in communication with the port 202 to thereby provide a pressure modulated flow through hose 150 to bellows 156 through a hose 206 connnected to port 202. When the magnetic coil 196 is in an unenergized condition, communication is had between the ports 202 and 204 so that atmospheric pressure is applied to the bellows 156 through hose 206 and a hose 208 extending outwardly to the port 204, the air supplied providing a dump for the vacuum pressure existing in bellows 156.

Since the current flow to the anode 194 is of insufficient value so as to induce a flow of energy to the magnetic coil 196, a speed set portion 210 of the control circuit 164 is provided. A lead 212 extends from the contact 170 and is electrically connected to a contact 214 of an ignition switch 216. An opposite contact 218 of the ignition switch 216 is placed in active current carrying condition with a lead 220, when the ignition switch 216 is placed in on position. Lead 220 extends from the ignition switch to a contact 222 of the transmission drive switch 180. An opposite contact 224 of this switch is placed in current carrying position with the lead 220 when the transmission of the vehicle is placed in drive position. A lead 226 extends from the contact 224 and is attached to a contact 228 of a speed set and resume switch 230. Contact 228 is also in electrical contact, at all times, with the variable rheostat which provides for variation of the input speed of the electric motor 12. An opposite contact 232 of the speed set and resume switch 230 is placed in electrical connection with a lead 236 when the switch 230 is depressed. A resistance 234 is provided in the lead 236, extending from the contact 232, so that a proper voltage may be applied to a gate valve 238 of the silicon rectifier 190.

Operation of the complete control circuit 164 is as follows. Electrical potential is provided from the battery 16 through the lead 168, contact 170 and lead 172 to the switch 20 and from this switch to the lead 174, contacts 182 and 184 and lead 186 to the anode 194. This electrical potential cannot flow from the anode 194 to the cathode 188 and thence to the magnetic coil 196 of the dump valve 155 until gate valve 238 is energized.

Such energization occurs in the following manner. Ignition switch 216 is placed in the on position so that potential is available at the contact 228 of switch 230, by the passage of current from the battery 16 through leads 168 and 212, switch 216, lead 220, transmission drive switch 180 and lead 226. Depression of the switch 230 (Generally between 30—90 miles per hour) will lock in the desired set speed by providing a flow of current through lead 236 and resistance 234 to the gate valve 238, thereby permitting a flow of electricity from the anode 194 to the cathode 188 and thence to the electromagnetic coil 196. This urges the piston 198 to its upward position and provides a modulated flow of pressure from the hose 150 to the bellows 156. Current flow to the electromagnetic coil 196 once obtained through actuation of gate valve 238 is maintained through the cathode 188 by the current flow through the lead 186.

In the event that the brake of the vehicle is actuated, for example, because of some obstruction on the road, brake switch 20 will open thereby removing potential from the anode 194 and permitting the magnetic coil 196 to become unenergized. This permits the piston 198 to move downwardly from the position shown in FIG. 5 thereby providing a flow of atmospheric air to the bellows and 156 and functioning to dump the modulating pressure to the bellows 156 and functioning to dump the modulating pressure to the bellows to permit the throttle control plate 160 to move to a complete decelerated position.

In order to resume speed the operator's foot is removed from the brake, again providing a potential to the anode 194. Momentary depression of the speed set and resume switch 230 provides a flow of current to the gate valve 238 thereby permitting the flow of current to the anode from the cathode 188 and reenergizing the electromagnetic coil 196. Since the desired speed of the vehicle has already been set by the variable resistance 21, the vehicle will again resume that speed dictated by the modulated pressure in bellows 156 which pressure is, in turn, modulated by the parameters provided by the differencing means 85.

It should be obvious to one skilled in the art that the apparatus just described readily meets the objects of the invention and provides the advantages attendant to this invention and that many obvious alternatives to the described structure will occur to one skilled in the art. For example, the differencing means 85 could utilize a planetary gear means to provide the signal output which actuates the valve plate 104 and other control circuitry could be utilized to complete the apparatus. Such obvious alternatives are, therefore, considered to fall within the spirit and scope of this invention.

I claim:

1. A device for adjustably controlling the speed of operation of an internal combustion engine which comprises: (a) a variable speed first input means, (b) a first drive means drivingly connected to said first input means, (c) a second input means having its speed related to the speed of said internal combustion engine, (d) a second drive means drivingly connected to said second input means, (e) a speed differencing means connected to said first and second drive means in a driven relationship, (f) a valve plate means controlled by said speed differencing means, (g) a vacuum source from said internal combustion engine, (h) a vacuum chamber adapted to vary the speed of said internal combustion engine when connected with said vacuum source, (i) a valve body having three ports therein, the first of said ports connected to said vacuum source, the second of said ports being connected to said vacuum chamber, and the third of said ports being open to the atmosphere, and (j) said valve plate means connecting said first and second ports when increased speed of said internal combustion engine is required, and connecting said second and third ports when decreased speed of the internal combustion engine is required.

2. A device for adjustably controlling the speed of an internal combustion engine according to claim 1, wherein said first input means is a variable speed electric motor.

3. A device for adjustably controlling the speed of an internal combustion engine according to claim 1, wherein said speed differencing means comprises a plurality of bevel gear differentials whose direction of output rotation is dependent on the relative speeds between said first and second drive means.

4. A device for adjustably controlling the speed of an internal combustion engine according to claim 1, wherein said valve plate means includes a V-shaped opening for communicating with said first, second and third ports.

5. A device for adjustably controlling the speed of an internal combustion engine which comprises: (a) a housing, (b) a variable speed electric motor mounted rigidly to said housing and having a shaft extending into said housing, (c) a rotary input means extending into the end of said housing opposite said electric motor, (d) a first bevel gear differential within said housing, having a first and a second coaxial side gear and a first set of pinion mates, said first side gear fixedly attached to said shaft of said electric motor and rotatable therewith, said second side gear fixedly attached to said rotary input means and rotatable therewith, (e) a first carrier within said housing attached to said first set of pinion mates and adapted to rotate therewith about said axis of said side gears, (f) a second bevel gear differential within said housing and coaxial with said first bevel gear differential, said second bevel gear differential having third and fourth coaxial side gears and a second set of pinion mates, said third side gear fixedly attached to said first carrier and rotatable therewith about said axis of said side gears, (g) a valve plate attached to said fourth side gear and rotatable therewith about said axis of the side gear, (h) a fluidic pressure source, (i) an expansible chamber means adapted to vary the speed of said internal combustion engine, (j) a valve body adjacent to said valve plate and having three ports, the first of said ports communicating with said pressure source, the second of said ports communicating with said expansible chamber means, and the third of said ports vented to the atmosphere, (k) said valve body and said valve plate cooperating together to place said first and second ports in increased communication when an increased speed of said internal combustion engine is required and to place said second and third ports in increased communication when a decreased speed for said internal combustion engine is required.

6. A device for adjustably controlling the speed of an internal combustion engine according to claim 5, having a spur gear reduction set intermediate said variable speed motor and said first side gear.

7. A device for adjustably controlling the speed of an internal combustion engine according to claim 5, including means for restricting the rotational movement of said valve plate.

8. A device for adjustably controlling the speed of an internal combustion engine according to claim 7, wherein said means to restrict the rotational movement of said valve plate comprises a pair of spaced pin means mounted with said valve body.

9. A device for adjustably controlling the speed of an internal combustion engine as set out in claim 5 wherein a dump valve means is disposed between said fluidic pressure source and said expansible chamber means.

10. A device for adjustably controlling the speed of an internal combustion engine as set out in claim 9 wherein electromagnetic means are provided for controlling said dump valve means, said electromagnetic means being actuated by a circuit including a silicon controlled rectifier means.

11. A device for adjustably controlling the speed of an internal combustion engine as set out in claim 10 wherein said circuit means also includes a speed set means and a brake actuated circuit interrupting means.

12. A speed control device including; (a) a variable, settable first speed input means, (b) a first drive means drivingly connected to said first input means, (c) a second speed input means having a speed regulated to the speed to be controlled, (d) a second drive means drivingly connected to said second input means, (e) a planetary differencing means controlling a valve means, (f) said valve means imposing a varying pressure on a servo bellows.